(12) United States Patent
Stählin

(10) Patent No.: US 11,332,136 B2
(45) Date of Patent: May 17, 2022

(54) AUTOMATED VEHICLE LANE POSITIONING

(71) Applicant: Continental Automotive Systems, Inc., Auburn Hills, MI (US)

(72) Inventor: Ulrich Stählin, Oakland Township, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 305 days.

(21) Appl. No.: 16/706,071

(22) Filed: Dec. 6, 2019

(65) Prior Publication Data

US 2021/0171028 A1    Jun. 10, 2021

(51) Int. Cl.
| | |
|---|---|
| *B60W 30/12* | (2020.01) |
| *G01C 21/36* | (2006.01) |
| *G08G 1/16* | (2006.01) |
| *G06F 7/58* | (2006.01) |
| *B60W 10/20* | (2006.01) |
| *B60W 30/095* | (2012.01) |
| *G06V 20/56* | (2022.01) |

(52) U.S. Cl.
CPC ............ *B60W 30/12* (2013.01); *B60W 10/20* (2013.01); *B60W 30/095* (2013.01); *G01C 21/3658* (2013.01); *G06F 7/586* (2013.01); *G06V 20/588* (2022.01); *G08G 1/167* (2013.01)

(58) Field of Classification Search
CPC .... B60W 30/12; B60W 30/095; B60W 10/20; G01C 21/3658; G06F 7/586; G06K 9/00798; G08G 1/167

USPC .......................................................... 701/41
See application file for complete search history.

(56) References Cited

U.S. PATENT DOCUMENTS

| | | | |
|---|---|---|---|
| 8,965,633 B2* | 2/2015 | Lee ...................... | B60W 50/10 701/41 |
| 2013/0226406 A1* | 8/2013 | Ueda ...................... | B62D 1/28 701/41 |
| 2014/0180543 A1* | 6/2014 | Ueda ...................... | B62D 1/28 701/41 |
| 2016/0096546 A1* | 4/2016 | Chia ..................... | B62D 5/0466 701/41 |
| 2016/0107645 A1* | 4/2016 | Okuda ............... | G06K 9/00798 701/41 |
| 2019/0086929 A1* | 3/2019 | Tamboli ............... | G05D 1/0214 |
| 2020/0250438 A1* | 8/2020 | Schachter ............. | G01S 15/931 |

FOREIGN PATENT DOCUMENTS

| | | |
|---|---|---|
| DE | 102019201215 A1 | 12/2019 |
| DE | 102019111093 A1 | 11/2020 |
| WO | 2019066949 A1 | 4/2019 |

OTHER PUBLICATIONS

German Search Report dated Aug. 23, 2021 for the counterpart German Application No. 10 2020 215 132.6.

* cited by examiner

*Primary Examiner* — Peter D Nolan
*Assistant Examiner* — Luke Huynh

(57) ABSTRACT

A vehicle lane positioning system includes a sensor arrangement that is designed to determine lateral boundaries of a vehicle lane. A control unit is designed to calculate a vehicle travel path within the vehicle lane having a predetermined variation from a centered vehicle pathway. An actuator unit is designed to execute the vehicle travel path within the vehicle lane.

16 Claims, 3 Drawing Sheets

AUTOMATED VEHICLE LANE POSITIONING

BACKGROUND

The present disclosure is related to laterally positioning an autonomously maneuvered vehicle within a vehicle lane.

Vehicles are including a greater number of autonomous features, such as features that are able to provide driving control with less driver intervention. One example includes autonomous parking where the vehicle automatically steers the vehicle into a parking spot. Additionally, systems having lane centering capabilities are used to maintain the vehicle near the center of a vehicle lane.

SUMMARY

In one exemplary embodiment, a vehicle lane positioning system includes a sensor arrangement that is designed to determine lateral boundaries of a vehicle lane. A control unit is designed to calculate a vehicle travel path within the vehicle lane having a predetermined variation from a centered vehicle pathway. An actuator unit is designed to execute the vehicle travel path within the vehicle lane.

In a further embodiment of any of the above, the vehicle travel path is offset from a center of the vehicle lane.

In a further embodiment of any of the above, the predetermined variation for the vehicle travel path is determined based on a predetermined time schedule.

In a further embodiment of any of the above, the predetermined variation for the vehicle travel path is determined by a time schedule that varies on a periodic basis.

In a further embodiment of any of the above, an input unit selectively chooses the predetermined variation for the vehicle travel path.

In a further embodiment of any of the above, the input unit includes a wireless communication device capable of receiving an input to select the predetermined variation.

In a further embodiment of any of the above, the predetermined variation path for the vehicle travel path continuously varies between the lateral boundaries.

In a further embodiment of any of the above, the predetermined variation for the vehicle travel path includes a randomly selected variation from within a predetermined range of variation.

In a further embodiment of any of the above, the randomly selected variation is determined from a Pseudorandom Binary Sequence.

In a further embodiment of any of the above, the predetermined variation relative to the lateral boundaries is spaced by a clearance distance from each of the lateral boundaries.

In another exemplary embodiment, a method of positioning a vehicle within a lane includes determining lateral boundaries of a vehicle lane with a sensor arrangement. A vehicle travel path is calculated within the vehicle lane having a predetermined variation from a centered vehicle pathway with a control unit. The vehicle travel path is executed with an actuator unit.

In a further embodiment of any of the above, the vehicle travel path is offset from a center of the vehicle lane.

In a further embodiment of any of the above, the predetermined variation for the vehicle travel path is determined based on a predetermined time schedule.

In a further embodiment of any of the above, the predetermined variation for the vehicle travel path is determined by a time schedule that varies on a periodic basis.

In a further embodiment of any of the above, an input unit selectively chooses the predetermined variation for the vehicle travel path.

In a further embodiment of any of the above, the input unit includes a wireless communication device capable of receiving an input to select the predetermined variation.

In a further embodiment of any of the above, the predetermined variation path for the vehicle travel path continuously varies between the lateral boundaries.

In a further embodiment of any of the above, the predetermined variation for the vehicle travel path includes a randomly selected variation from within a predetermined range of variation.

In a further embodiment of any of the above, the randomly selected variation is determined from a Pseudorandom Binary Sequence.

In a further embodiment of any of the above, the predetermined variation relative to the lateral boundaries is spaced by a clearance distance from each of the lateral boundaries.

DETAILED DESCRIPTION

Autonomously or semi-autonomously driven vehicles are increasingly being used on vehicle roadways. When using the autonomously or semi-autonomously driven vehicles on the roadway, the vehicle must include a system that positions the vehicle laterally on in a vehicle lane on the roadway. One feature of these systems is the ability to maintain the vehicle nearly centered in the vehicle lane during operation, unlike a vehicle driven by a human drive that includes a greater variation of lateral movement in the vehicle lane. Because autonomously or semi-autonomously driven vehicles are centered in the vehicle lane during operation, a greater amount of road wear occur where the tires of the vehicle contact the roadway. One feature of this disclosure is to reduce the amount of wear experience on roadways from autonomous vehicles having tires that follow the same path.

Figure 1:
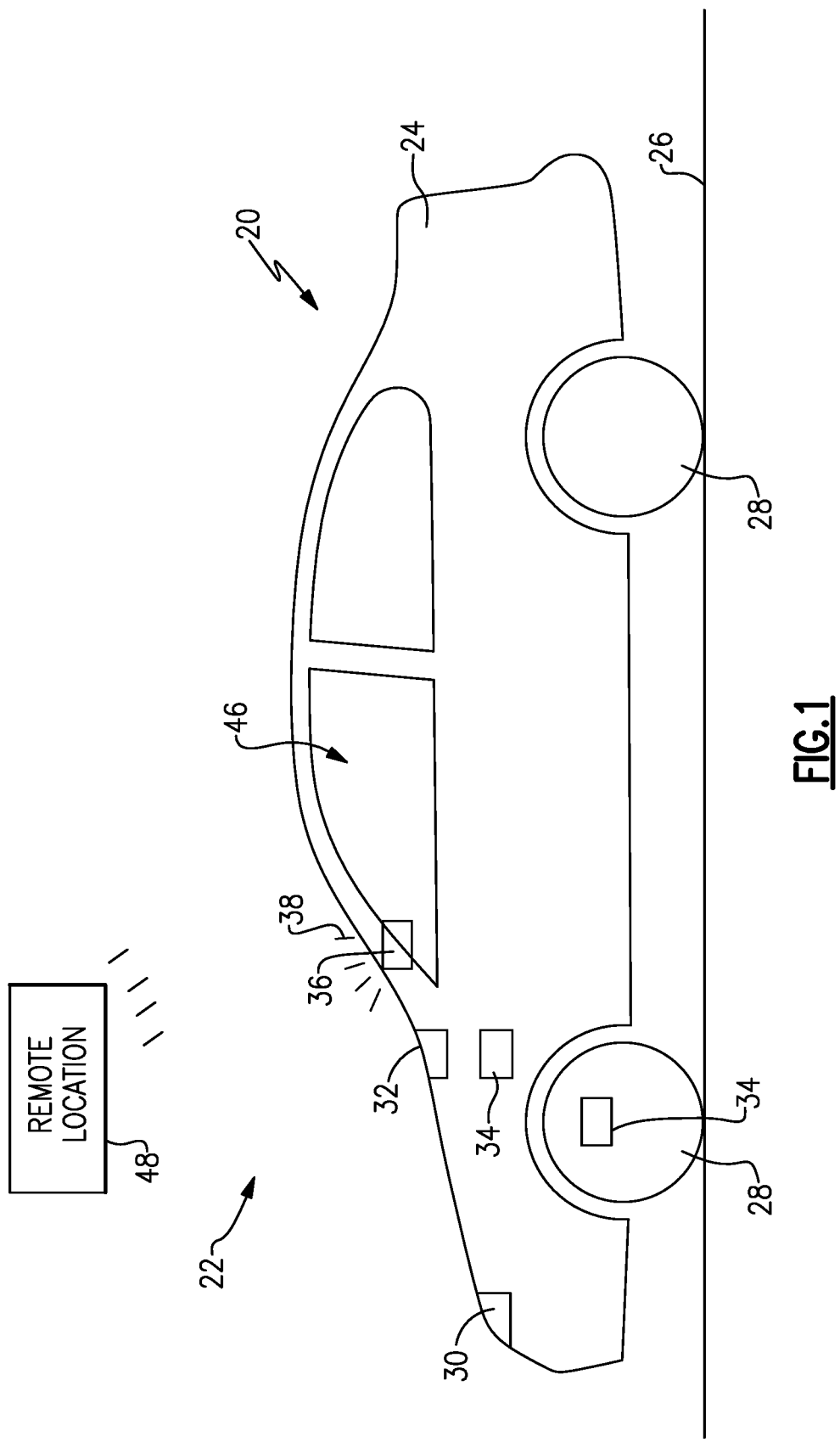
FIG. 1 schematically illustrates an embodiment of a lane positioning system on an example vehicle.

FIG. 1 illustrates an example vehicle 20 having a lane positioning system 22 according to this disclosure. The vehicle 20 includes a body portion 24 supported by a plurality of wheels 28 that contact a roadway 26. The front wheels 28 are generally steerable and rotatable while the rear wheels 28 are generally just rotatable.

In the illustrated example, the lane positioning system 22 includes a sensor arrangement 30, a controller unit 32, an actuator unit 34, and an input unit 36. The sensor arrangement 30 can include a camera or radar equipment to determine a left lane boundary 42 from a right light boundary 44 on the roadway 26 (See FIGS. 2-4). The illustrated examples in this disclosure describe situations where vehicles 20 are driven on the right side of the roadways 26, however, this disclosure also applies to vehicles 20 that are driven on the left side of roadways 26. Additionally, this disclosure applies to roadways 26 with bi-direction traffic as shown in FIGS.

2-4, roadways 26 with multiple vehicle lanes in a single direction, or roadways with only a single vehicle lane.

The control unit 32 includes a microprocessor and computer readable medium for storing programs to be executed by the control unit 32. The control unit 32 receives positioning information on the roadway 26 from the sensor arrangement 30 to generate a vehicle pathway 50 (See FIGS. 2-4). In this disclosure, vehicle pathway 50 describes a pathway followed by the vehicle 20 corresponding to a longitudinal centerline through the vehicle 20. The vehicle pathway 50 is realized on the roadway 26 through the control unit 32 communicating steering inputs to the actuator unit 34 to follow the vehicle pathway 50 generated by the control unit 32. The actuator unit 34 could include a portion of an electronic power steering system connected to a steering rack associated with the front wheels 28. Alternatively, the actuator unit 34 communicates position through a hydraulic power steering system to a steering rack associated with the front wheels 28.

The input unit 36 is located adjacent an interior compartment 46 of the vehicle 20 and includes inputs for a vehicle occupant to manipulate to select a predetermined variation of the vehicle pathway 50. Alternatively, the input unit 36 can communicate wirelessly 38 with a remote location 48 through the use of at least one of WIFI, Bluetooth, cellular network, or another wireless communication system, to select one from the predetermined variations of the vehicle pathway 50.

Figure 2:
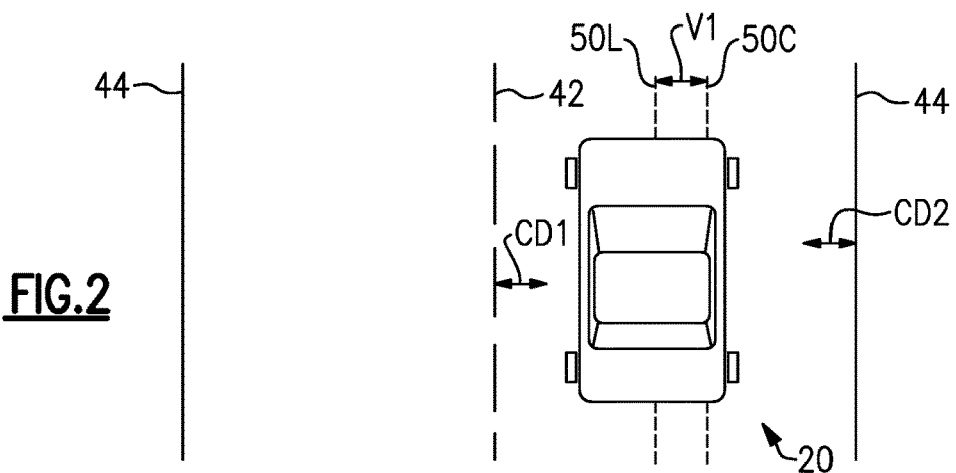
FIG. 2 schematically illustrates an example positioning of a vehicle within a vehicle lane.
Figure 3:
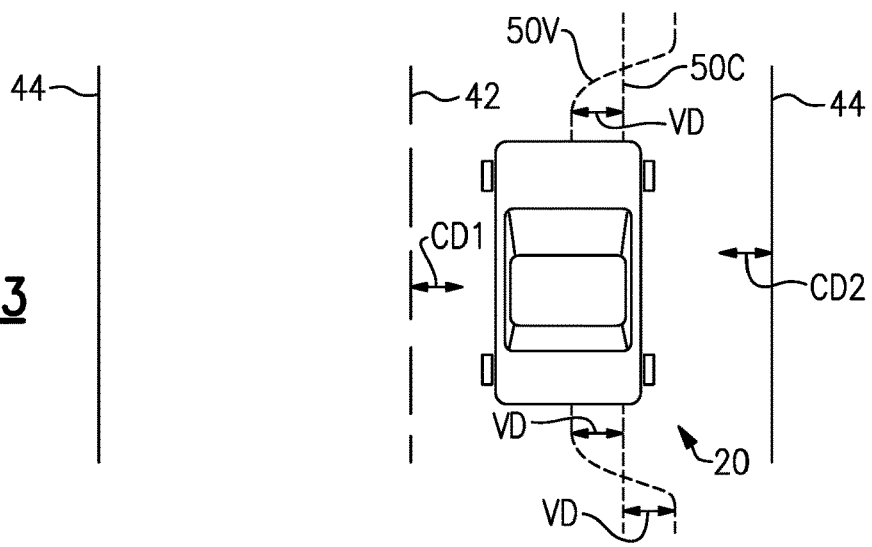
FIG. 3 schematically illustrates another example positioning of the vehicle within the vehicle lane.
Figure 4:
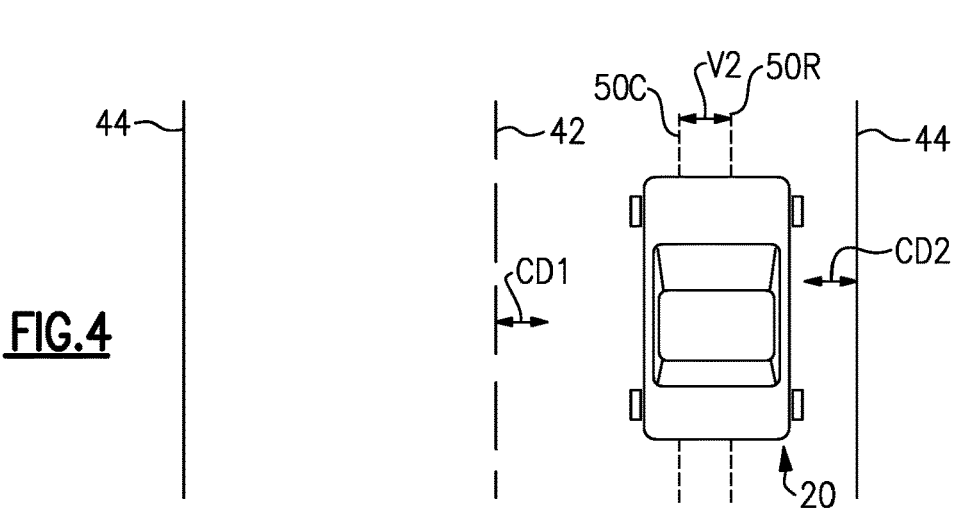
FIG. 4 schematically illustrates yet another example positioning of the vehicle within the vehicle lane.

As shown in FIGS. 2-4, when the vehicle 20 is centered between the left boundary 42 and the right boundary 44, the vehicle 20 would be following a center pathway 50C. However, as discussed above, when all of the autonomously or semi-autonomously controller vehicles 20 are following the centered vehicle pathway 50C, there is an increased level of wear where the tires 28 contact the roadway 26 because of the increased frequency of the vehicles 20 following the center pathway 50C.

The vehicle pathway 50 can be laterally offset from the centered vehicle pathway 50C using multiple predetermined variations. In the example shown in FIG. 2, the predetermined variation follows a left offset vehicle pathway 50L offset by a distance V1 to the left of the centered vehicle pathway 50C. In the example shown in FIG. 4, the predetermined variation follows a right offset vehicle pathway 50R offset by a distance V2 to the right of the centered vehicle pathway 50C.

In the example shown in FIG. 3, the predetermined variation follows a variable offset vehicle pathway 50V with an offset from the centered vehicle pathway 50C that varies in magnitude by an offset distanced VD as the vehicle 20 travels down the roadway 26. In this example, the variable distance VD can remain entirely on either the left side or the right side of the centered vehicle pathway 50C or transition across the centered vehicle pathway 50C. The variable offset vehicle pathway 50V can follow a cyclic pathway or a non-cyclic pathway.

In the illustrated example, the distances V1, V2, and VD can be selected based on a number of different criteria such as a width of the roadway 26, a width of the vehicle 20, and a vehicle occupants preferences for vehicle lateral position. Furthermore, when selecting the distances V1, V2, or VD, a clearance distance CD1 and CD2 from the left and right boundaries 42, 44 could be used limit a magnitude of the distances V1, V2, or VD to maintain the vehicle 20 spaced from the left and right boundaries 42, 44.

In order to reduce the concentration of road wear, the vehicle pathways 50L, 50R, and 50V could be selected based on a number of different criteria. In one example, the criteria includes a predetermined time schedule. The predetermined time schedule may vary from day to day or vary based on the time of day such that the schedule follows a periodic pattern.

Additionally, the vehicle pathways 50L, 50R, and 50V could be selected based on the vehicle occupant interacting with the input unit 36 or the remote location 48 communicating with the input unit 36. The remote location 48 may be a fleet headquarters or dispatch center that communicates wirelessly 38 with a number of fleet vehicles 20, such as buses or taxis, through the input units 36 on each respective fleet vehicle 20.

Furthermore, the vehicle pathways 50L, 50R, and 50V could be selected randomly, such as from a Pseudorandom Binary Sequence, from within a predetermined range of distances that would be suitable for the particular roadway 26. The predetermined range of distances is at least partially determined by the roadway 26, the vehicle 20, and the distances CD1 and CD2 as discussed above.

Figure 5:
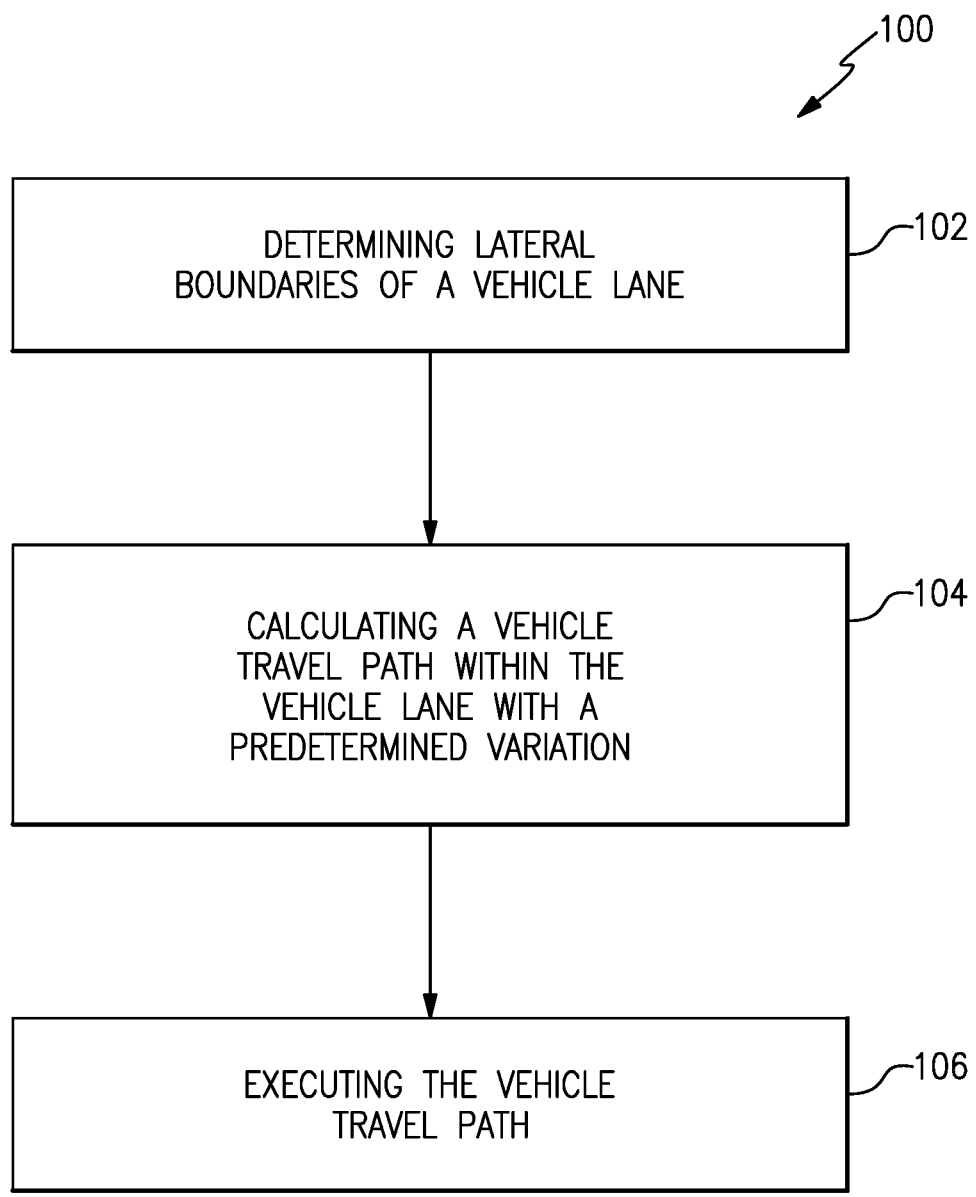
FIG. 5 illustrates a method according an embodiment of this disclosure.

FIG. 5 illustrates an example method 100 of positioning the vehicle 20 on the roadway 26 according to this disclosure. The control unit 32 determines lateral boundaries from the position information obtained from the sensor arrangement 30 on the vehicle 20 (102). The control unit 32 also calculates the vehicle pathway 50 (104) to be executed by the actuator unit 34 (106). When the control unit 32 calculates the vehicle pathway 50 to be taken by the vehicle 20, the control unit 32 can generate the pathway 50 based on the centered pathway 50C and then add the desired offset. Alternatively, lateral control performed by the control unit 32 can add the offset to the centered pathway 50C.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present disclosure.

Although the different examples have specific components shown in the illustrations, embodiments of this disclosure are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A vehicle lane positioning system comprising:
   a sensor arrangement designed to determine lateral boundaries of a vehicle lane;
   a control unit designed to calculate a vehicle travel path within the vehicle lane having a predetermined variation from a centered vehicle pathway;
   an actuator unit designed to execute the vehicle travel path within the vehicle lane; and
   wherein the predetermined variation for the vehicle travel path is offset from a center of the vehicle lane and includes a randomly selected variation from within a predetermined range of variation.

2. The system of claim 1, wherein the predetermined variation for the vehicle travel path is determined based on a predetermined time schedule.

3. The system of claim 2, wherein the predetermined variation for the vehicle travel path is determined by a time schedule that varies on a periodic basis.

4. The system of claim 1, including an input unit for selectively choosing the predetermined variation for the vehicle travel path.

5. The system of claim 4, wherein the input unit includes a wireless communication device capable of receiving an input to select the predetermined variation.

6. The system of claim 1, wherein the predetermined variation for the vehicle travel path continuously varies between the lateral boundaries.

7. The system of claim 1, wherein the randomly selected variation is determined from a Pseudorandom Binary Sequence.

8. The system of claim 1, wherein the predetermined variation relative to the lateral boundaries is spaced by a clearance distance from each of the lateral boundaries.

9. A method of positioning a vehicle within a lane comprising:
   determining lateral boundaries of a vehicle lane with a sensor arrangement;
   calculating a vehicle travel path within the vehicle lane having a predetermined variation from a centered vehicle pathway with a control unit; and
   executing the vehicle travel path with an actuator unit; and
   wherein the predetermined variation for the vehicle travel path is offset from a center of the vehicle lane and includes a randomly selected variation from within a predetermined range of variation.

10. The method of claim 9, wherein the predetermined variation for the vehicle travel path is determined based on a predetermined time schedule.

11. The method of claim 10, wherein the predetermined variation for the vehicle travel path is determined by a time schedule that varies on a periodic basis.

12. The method of claim 9, including an input unit for selectively choosing the predetermined variation for the vehicle travel path.

13. The method of claim 12, wherein the input unit includes a wireless communication device capable of receiving an input to select the predetermined variation.

14. The method of claim 9, wherein the predetermined variation for the vehicle travel path continuously varies between the lateral boundaries.

15. The method of claim 9, wherein the randomly selected variation is determined from a Pseudorandom Binary Sequence.

16. The method of claim 9, wherein the predetermined variation relative to the lateral boundaries is spaced by a clearance distance from each of the lateral boundaries.

* * * * *